(12) United States Patent
Koebrick et al.

(10) Patent No.: US 11,324,375 B2
(45) Date of Patent: May 10, 2022

(54) AUTOMATED FLOOR MAINTENANCE SYSTEM

(71) Applicants: Jeffrey L. Koebrick, St. Augustine, FL (US); Matthew Leroy Klingler, Ada, OH (US)

(72) Inventors: Jeffrey L. Koebrick, St. Augustine, FL (US); Matthew Leroy Klingler, Ada, OH (US)

( * ) Notice: Subject to any disclaimer, the term of this patent is extended or adjusted under 35 U.S.C. 154(b) by 213 days.

(21) Appl. No.: 16/522,249

(22) Filed: Jul. 25, 2019

(65) Prior Publication Data

US 2021/0022578 A1 Jan. 28, 2021

(51) Int. Cl.
*A47L 11/40* (2006.01)
*G05D 1/02* (2020.01)
*E04F 15/02* (2006.01)

(52) U.S. Cl.
CPC ....... *A47L 11/4011* (2013.01); *A47L 11/4036* (2013.01); *A47L 11/4072* (2013.01); *G05D 1/0214* (2013.01); *G05D 1/0219* (2013.01); *E04F 15/02044* (2013.01); *G05D 2201/0203* (2013.01)

(58) Field of Classification Search
CPC ............ A47L 2201/06; A47L 11/4011; A47L 11/4036; A47L 11/4072; G05D 1/0214; G05D 1/0219; G05D 2201/0203
See application file for complete search history.

(56) References Cited

U.S. PATENT DOCUMENTS

| | | | |
|---|---|---|---|
| 6,046,565 A | 4/2000 | Thorne | |
| 6,370,453 B2 | 4/2002 | Sommer | |
| 6,883,201 B2 | 4/2005 | Jones et al. | |
| 7,319,918 B2 | 1/2008 | Takenaka et al. | |
| 8,150,142 B2 | 4/2012 | Freedman et al. | |
| 8,350,847 B2 | 1/2013 | Shpunt | |
| 8,958,911 B2 | 2/2015 | Wong et al. | |
| 9,014,848 B2 | 4/2015 | Farlow et al. | |
| 9,746,559 B2 | 8/2017 | Zweigle et al. | |
| 10,168,701 B2 | 1/2019 | Berberian et al. | |
| 10,678,254 B1* | 6/2020 | Jonas | A47L 9/0477 |
| 2001/0004719 A1* | 6/2001 | Sommer | G05D 1/0219 701/23 |
| 2006/0293788 A1 | 12/2006 | Pogodin | |
| 2013/0231819 A1* | 9/2013 | Hung | A47L 11/4011 701/23 |
| 2014/0257563 A1* | 9/2014 | Park | A47L 9/009 700/259 |
| 2014/0278252 A1* | 9/2014 | Wold | G01N 27/048 702/189 |
| 2015/0367513 A1* | 12/2015 | Gettings | B25J 9/0084 700/248 |

(Continued)

FOREIGN PATENT DOCUMENTS

DE 102012105608 A1 1/2014

*Primary Examiner* — Ryan Rink
(74) *Attorney, Agent, or Firm* — Hall Estill Law Firm (57) ABSTRACT

A floor maintenance system can employ one or more autonomous assemblies that evaluate, characterize, and optimize a floor. A floor maintenance device can have one or more sensors connected to a local controller and a mapping circuit. The mapping circuit may be configured to change from a first floor detection resolution to a different second floor detection resolution in response to a detected floor condition.

20 Claims, 3 Drawing Sheets

(56) References Cited

U.S. PATENT DOCUMENTS

| | | | | |
|---|---|---|---|---|
| 2018/0098675 | A1* | 4/2018 | Sauer | A47L 9/2842 |
| 2018/0258593 | A1* | 9/2018 | Hills | E01C 19/12 |
| 2018/0364045 | A1* | 12/2018 | Williams | B25J 9/1679 |
| 2018/0368642 | A1* | 12/2018 | Son | A47L 9/28 |
| 2019/0029486 | A1* | 1/2019 | Suvarna | A47L 9/2826 |
| 2019/0072969 | A1* | 3/2019 | Han | G05D 1/0088 |
| 2019/0142236 | A1* | 5/2019 | Ziegler | A47L 5/14 15/319 |
| 2019/0204847 | A1* | 7/2019 | Noh | G01S 13/931 |
| 2019/0213438 | A1* | 7/2019 | Jones | G06T 7/74 |
| 2019/0365170 | A1* | 12/2019 | Mowisch | G08B 21/0461 |
| 2020/0009732 | A1* | 1/2020 | Gordon | G05D 1/0055 |
| 2020/0080266 | A1* | 3/2020 | Johnson | A01D 34/74 |
| 2020/0315421 | A1* | 10/2020 | Kung | G01N 21/55 |
| 2021/0020033 | A1* | 1/2021 | Rakshit | G05D 1/0088 |

* cited by examiner

AUTOMATED FLOOR MAINTENANCE SYSTEM

SUMMARY

A floor maintenance system, in some embodiments, has a floor maintenance device with one or more sensors connected to a local controller and a mapping circuit. The mapping circuit is configured to change from a first floor detection resolution to a different second floor detection resolution in response to a detected floor condition.

DETAILED DESCRIPTION

The various embodiments of the current disclosure are generally directed to a floor maintenance system that can utilize one or more autonomous assemblies to optimize the physical characteristics of a floor.

Despite the electronic and computer sophistication of many aspects of life, flooring has remained relatively simple with minimal technological advancements. The availability of different types of flooring materials has remained relatively stable through the years with variability of use usually relating to fashion trends rather than practical or technological advantages. Similarly, floor maintenance options have remained stable over time as the cleaning, polishing, and repair of floor materials is much the same today as it was decades, even generations ago.

Although residential floor cleaners have utilized robotics to automate the collection of debris and partial cleaning of floors, the existing robotic technology is not robust enough to effect substantial changes to floors. That is, current automated floor machines do not possess the computation, detection, and tooling capable of intelligently maintaining a floor. Additionally, the propensity of current floor cleaning robotics to be slow with relatively small resolution prevents the machines from being practical for large-scale and/or retail flooring environments.

Accordingly, an automated maintenance floor system is provided by assorted embodiments with robust intelligence, detection, and servicing tools that provide practicality for large-scale flooring environments. The ability for a floor maintenance assembly to autonomously identify flooring issues to be cleaned, repaired, and mapped allows for efficient floor servicing operations to be scheduled. The ability for a floor maintenance assembly to subsequently perform varying levels of floor service can provide quick solutions to discovered issues with a floor. The ability to intelligently carry out proactive floor servicing operations further provides practical prevention of potential hazards.

Floors aesthetics and floor safety have continued to be an industry and consumer concern, but one may not ensure the other. In some environments, floor aesthetics is placed as priority over safety while other environments, such as industrial flooring environments, place a greater priority on safety over aesthetics. The larger question in the flooring market space is how does the ever-changing conditions and interactions of human foot traffic patterns affect floor safety and/or floor aesthetics.

It is noted that a diverse variety of floor measuring means are currently available. For instance, there are wildly accepted measurement methods and devices that are currently in the floor maintenance market space that conduct metric measurement of flooring aesthetics and safety. Such diverse floor measuring means are also currently widely specified by flooring designs so that data that is collected must be checked in regards to current safety standards levels set by a number of different governing bodies and application details of a number of different manufactures of flooring systems. As such, there does not exist a measuring means or method for economically collecting floor metrics and/or measurements, nor is there a methodology that provides an unbiased method of data collection to date.

In the past, flooring metrics and measurements have been only collected and/or recorded at the time of flooring installation. The process by which flooring measurements are collected have not traditionally been collected in a truly unbiased methodology as human interaction is needed at all levels from selection of the measured area to actuating the measuring device and recording the measurement, which is not a true and unbiased scientific method of collecting aesthetic and floor safety data as measurements can, and are, often skewed in favor of the measuring party.

With these issues in mind, assorted embodiments facilitate true random methodology to the collection and storage of flooring data by building a floor maintenance device that has at least two modes of operation to optimize floor measurement and safety over time after initial installation. In a first non-limiting operational mode, a floor maintenance device follows an operator and, when signaled via a handheld connection device, such as cellular handheld and/or other computer connected device, the device will stop and collect a floor measurement and then transmit the collected data via secured internet channel to a remote database server unit.

The ability for an operator to modify the manner and location in which floor data is collected provides a true and unbiased data sample. By restricting modification and/or access to data records on the server, data integrity will be maintained. It is contemplated that failed floor measurements are marked as such, but will remain in the floor or surface records perniamently as a failed reading for future analysis.

In a non-limiting second operational mode, a floor maintenance device can be activated in a full random mode where the device is permitted to freely roam about a floor surface utilizing with an onboard navigation system employing and a random number generation algorithm that allows the device to randomly calculate where to travel for data collection and how many data samples to collect. Once a data sample is collected, the measured data is again transmitted to the same remote database server unit using the same server protocol process as before and thus ensuring a truly unbiased sample reading.

It is noteworthy that each example operational mode is distinct from industry practices in multiple manners. The collection of data into the database allows an infinite number of reports and analysis can be performed on the data. Data collected in the methodical unbiased approach discussed above will provide floor owners, manufactures, and installers a fresh new perspective regarding aspects of safety, maintenance systems, total costs of ownership, end-of-life studies, floor traffic patterns, and critical data for determining placement of matting, or specific types of flooring for high wear, heavily trafficked areas. As a result, product consumers and suppliers for the first time will be able to measure "true" floor performance under load and the implications of regular traffic pattern to establish benchmarks regarding the economics of different flooring solutions while permitting seamless integration into the growing demand for building information modeling (BIM) by architects, engineers, and faculty managers.

With the two exemplary operational modes, a floor maintenance system can provide a real-time vantage point solution in regards to floor safety and maintenance processes to evaluate floor performance to assist in the design, implementation, and management of floor systems. Such real-time vantage point solution can aid in the execution of a safe floor management policy to prevent assorted hazardous situations, such as slip and fall injuries, in retail, commercial, and industrial floor environments as well as pedestrian trafficked surfaces, such as sidewalks, ramps, foyers, and lobbies.

Figure 1:
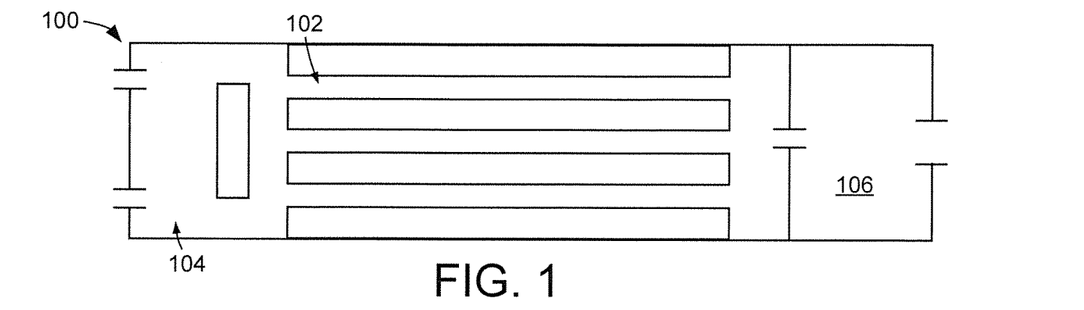
FIG. 1 is a block representation of an example flooring environment in which assorted embodiments can be practiced.

FIG. 1 depicts a top view block representation of an example flooring environment 100 in which assorted embodiments can be practiced. It is contemplated that the flooring environment 100 is a residential, retail, commercial, or industrial site, but various embodiments are directed to a site with relatively large volumes of foot traffic, such as retail or commercial sites open to the public.

In the non-limiting retail site shown in FIG. 1, the flooring environment 100 can consist of one or more flooring regions that can correspond with different areas of a location, different products being present, and/or different activities being performed. While a uniform type of flooring may be installed throughout an environment 100, some embodiments arrange a first region 102 with a first type of flooring, a second region 104 with a second type of flooring, and a third region 106 with a third type of flooring. The installation of different types of flooring allows the environment 100 to customize the visual appeal and practical safety of patrons.

As an example of a flooring configuration, the first region 102 can have flooring that is conducive to high volumes of traffic, such as tile, while the second region 104 can have flooring that is conducive to traction when wet, such as carpet or matting, and the third region 106 may have flooring conducive to heavy equipment or loads, such as concrete. The presence of different types of flooring in an environment 100 can pose a number of challenges for maintenance purposes. For instance, different types of flooring may require different measurement means for accurate identification of metrics, different cleaning means for safe and efficient contamination abatement, and different servicing tools for providing surface friction.

Figure 2:
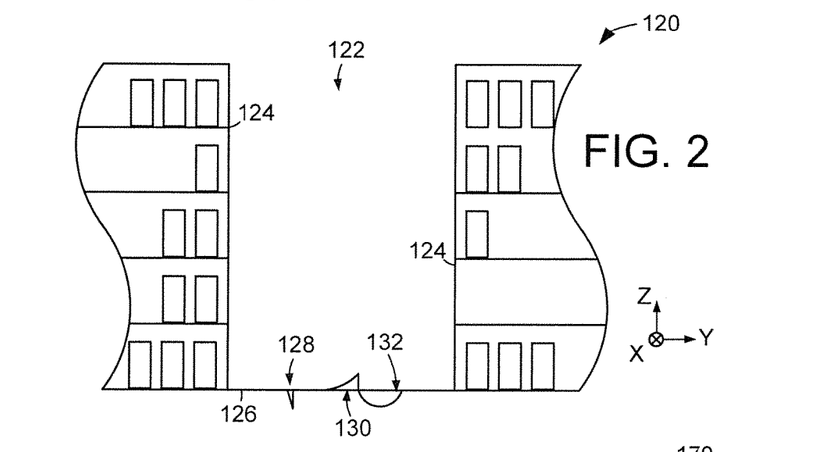
FIG. 2 depicts a line representation of portions of an example flooring environment capable of being optimized in various embodiments.

FIG. 2 depicts a side view of a portion of an example flooring environment 120 in which a floor maintenance system can be implemented to provide optimal floor performance and safety. The flooring environment 120 has an aisle 122 defined by shelves 124 that can each support one or more products, or machinery, being used or available for purchase. A floor surface 126 of the aisle 122 can be any type of flooring, such as ceramic tile, vinyl tile (VCT), laminates, overlayments, wood, concrete, terrazzo, rubber, or a polymer coating. It is contemplated that the floor surface 126 may have an intended grade relative to the X-Y plane, but such grade is expected to be uniform throughout a region, such as from shelf 124 to shelf 124.

Regardless of the grade of the floor surface 126, imperfections can occur during installation and afterwards during use. Whether from unexpected activity, such as dropping an object or a patron wearing cleats, hard shoe soles, or from expected normal foot traffic, imperfections, wear caused from dirt, debris, forklifts, carts, or other hard dynamic engagement can pose hazards that jeopardize the productivity and safety of patrons traversing the aisle 122. FIG. 2 illustrates some example imperfections, but is in no way exhaustive of the types of imperfections that can plague a floor surface 126.

As shown, a crack 128, rise 130, and recess 132 can be present individually or concurrently in the aisle 122 and can pose performance and safety risks regardless of the size and location of the respective imperfections. Any floor surface 126 imperfection may be attributed to one or more contributing factors, such as the buildup of wax, grime, and residue, the presence of carpet ripples, or the difference in surface coating thickness. It is noted that each imperfection 128/130/132 can pose different difficulties for automated detection, measurement, and repair. The presence of imperfections can be particularly difficult for a single device when multiple different flooring types are present in a single location. That is, an automated device needs to have the autonomous ability to utilize different types of floor measurement means along with the ability to discern which measurement means to use to accurately and efficiently identify the respective imperfections 128/130/132.

Furthermore, the identification of imperfections does not guarantee an ability to properly assess how to repair, or mitigate the severity of, the detected imperfection(s). Thus, various embodiments configure a single floor maintenance device to provide intelligent utilization of multiple different floor measurement means to identify floor imperfections and assignment of floor repair operations. The ability to employ different floor measurement means can also identify surface wear that may not be an imperfection, but corresponds with foot traffic and mechanical wear. The collection and intelligent interpretation of foot traffic allows a floor maintenance system to conduct proactive actions that can mitigate the risk of imperfections occurring in the future.

Figure 3:
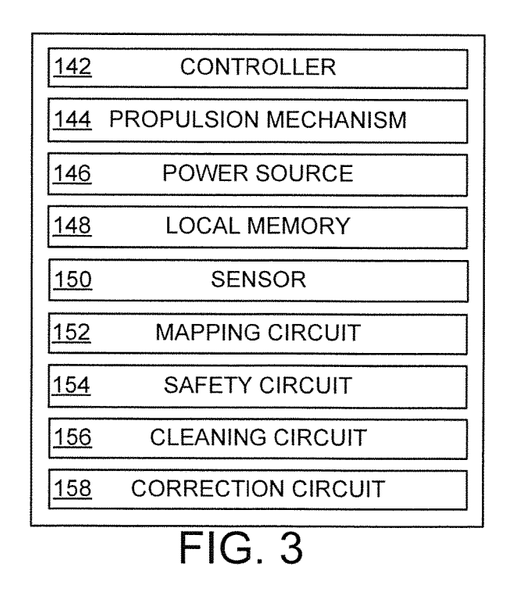
FIG. 3 displays a block representation of an example floor maintenance assembly that can be configured and operated in accordance with some embodiments.

FIG. 3 depicts a block representation of an example floor maintenance device 140 that can be employed as part of a floor maintenance system in accordance with some embodiments. The device 140 is configured with at least one local controller 142, which may be any programmable circuitry, such as a microprocessor or application specific integrated circuit. The local controller 142 can direct operations of the assorted aspects of the device 140, such as operations that employ one or more propulsion mechanism 144 that translates electrical power from a local power source 146 to physical movement. It is contemplated that the propulsion mechanism 144 consists of one or more motors coupled to at least one wheel or other rotating assembly employing a bearing.

The local controller 142 can execute one or more maintenance protocol stored in local memory 148 and/or downloaded from a remote host via a communications interface, such as a cellular or Wi-Fi antenna. A maintenance protocol can provide assorted mapping, cleaning, identifying, and servicing functions individually, sequentially, or concurrently. It is contemplated that multiple separate maintenance protocol can be concurrently executed by the local controller 142 with, or without, the aid of external processing from a connected host.

A maintenance protocol, in some embodiments, utilizes one or more sensors 150 that individually or concurrently operate to detect one or more metrics pertaining to flooring. For instance, one or more optical, acoustic, mechanical, or environmental sensors 150 can be used to sense the topography, the coefficient of friction, the reflectivity, and the density of a flooring surface 126. The sensors 150, and the data collected from the sensors 150, can be employed by the controller 142 to conduct at least floor mapping, imperfection identification, cleaning, and servicing operations.

It is contemplated that additional stationary sensors external to the device 140 may be fixed to a position, such as a shelf or entrance, to record ground level data, such as types of shoe sole material, type of shoe, customer walking cadence, and shoe sole coefficient of friction. The use of external sensors can complement the device sensors 150 to intelligently predict the location and severity of floor surface 126 wear. Such external sensor data may further allow the device 140 to modify existing route, tooling, and/or function to accommodate the number and types of shoes entering a flooring environment. For example, external sensors may collect data that is used by a device 140 to check the location and quality of one or more mats and/or the floor surface 126 proximal a mat, which can be particularly hazardous in assorted weather conditions and in response to frequent foot traffic from certain types of shoes.

For mapping operations, the local controller 142 may employ a mapping circuit 152 to intelligently set the movement and data collection of floor data, via the sensors 150, that allows for at least the topography of the floor to be accurately and precisely logged. The mapping of some, or all, of a floor surface 126 can be interpreted by the local controller 142 and/or a safety circuit 154 to determine if a safety hazard exists and, if so, what actions are appropriate to correct or at least mitigate the risk of injury, as part of a safety strategy generated in response to real-time sensed floor conditions.

An accurate map of a floor surface 126 can also allow a cleaning circuit 156 to efficiently identify the presence of a contaminant. The cleaning circuit 156 can classify a floor contamination and subsequently identify one or more cleaning actions that are directed at eliminating the contamination in the most efficient and thorough manner. In the event a contamination cannot be eliminated by a maintenance device, the cleaning circuit 156 can generate a mitigation procedure that reduces the risk of patron injury while a supplemental cleaning operation can be scheduled and carried out, such as employee manual cleaning or additional automated machines being used to clean the floor surface 126.

Assorted reactive and proactive safety actions can be evaluated and chosen by a correction circuit 158 in response to data collected and processed by the safety circuit 154, mapping circuit 152, and local controller 142. The correction circuit 158 can activate one or more sensors 150 to collect floor data or rely on data collected and/or interpreted by other circuitry of the device 140. With pertinent floor data, the correction circuit 158 can generate a strategy for eliminating an imperfection or mitigating the risk of the imperfection. The correction circuit 158 can intelligently determine if on-board servicing tools are sufficient to correct an imperfection or are insufficient and will require increased levels of tooling provided by other machinery.

Through the use of the various aspects of the maintenance device 140, efficiency, safety, and cost improvements can be provided in the general area of environmental monitoring systems. By configuring the maintenance device 140 with intelligence and diverse detection and correction tools, an autonomous, or semi-controlled robot is provided that moves along a floor surface taking various measurements relating to a characteristic of the floor.

In a non-limiting embodiment, a maintenance device can optimize the flooring in a retail store, such as a Walmart, an automotive dealership showroom, a hotel lobby, an airport terminal, or a warehouse. The autonomous mapping, cleaning, correction, and safety aspects of a maintenance device would direct movement and the collection of floor metrics, such as the coefficient of friction of the floor surface. It is contemplated that many thousands, or millions, of measurements could be taken autonomously by a maintenance device. While not required or limiting, floor metrics that can be measured by a maintenance device 140 can be distinction of image (DOI), haze, gloss, surface texture, average roughness, and average smoothness for a given area.

The maintenance device 140 can be outfitted with propulsion mechanism 144 and any number of sensors 150 that are conducive to a broad range of surfaces and flooring types. For instance a propulsion and sensor setup may be conducive to relatively hard floor surfaces, such as tile, concrete, stone, and wood while other device setups can be more conducive to efficient and accurate analysis of softer floor surfaces, such as coated, carpet, or rubber.

In some cases, a maintenance device 140 starts with a map of the layout of the floor environment, or facility. Such a map may be generated by the device 140 itself or may employ some other mechanism, such as a downloaded floor plot. If a floor map generated by the maintenance device 140 itself, various detection mechanisms could be used to aid in the efficiency and accuracy of map generation, such as a side-sonar, optical, acoustic, or mechanical type of detection that may, or may not involve physical contact with the floor surface.

Once the map has been generated, the map can be downloaded, or otherwise supplied, to the maintenance device 140, the device 140 can enjoy increased efficiency for future floor measurements not involved with mapping. That is, the maintenance device 140 can rely on past floor maps to allow the computing power of the device 140 to be focused on non-mapping functions. It is contemplated that a mapping circuit 152 may simply change floor mapping resolution while staying active to increase available computing power.

Such active mapping circuit 152 can provide sufficient resolution to maintain, with a high degree of accuracy, where the device 140 is within the floor environment as well as if any changes to the floor layout are present. For example, the presence of a new end-cap display is added, or removed, from a shelf 124, the maintenance device 140 can log the change in floor layout and subsequently update the existing floor map. It is contemplated that one or more prior versions of floor maps may be retained and used for comparison purposes by the maintenance device 140 over time, which can increase the accuracy and speed of floor layout change recognition.

In some embodiments, the maintenance device 140 can detect assorted types of safety and/or contamination, such as a localized spill or residual water from cleaning and/or polishing operations. The detection of such floor hazards can result in the generation of an alert to the store manager, or other responsible individual(s). Such detection may alternatively trigger the activation of a separate cleaning device that can perform floor cleaning activities or recommend a solution, such as recommending replacement squeegee attachment blade, adjusting the speed of water delivery, or adjusting the pressure of suction. Hence, a maintenance system may employ multiple separate, or tethered, devices that perform independent and/or redundant functions with different, or matching, computer and tool capabilities, such as an optical sensor affixed to the device 140. A warning device, in some embodiments, can also be activated by the maintenance device 140 to conduct warning services, such as issuing lights, sounds, or physical barriers around a detected floor hazard and/or imperfection.

The ability to deploy multiple devices concurrently in a floor environment allows a second clean up and/or repair device to actually conduct floor servicing, such a repairs or cleaning operations, while the maintenance device continues to conduct mapping or other floor metric measurements. Contrawise to the autonomous evaluation and handling of encountered floor situations, an employee of a retail, commercial, or industrial location can manually issue alerts to one or more devices, such as the presence of a spill on a particular aisle, that triggers the scheduling, or immediate action, that services the alert to bring a floor surface into safe working order and, perhaps, perform subsequent floor testing to confirm the alert was adequately corrected or mitigated.

Figure 4:
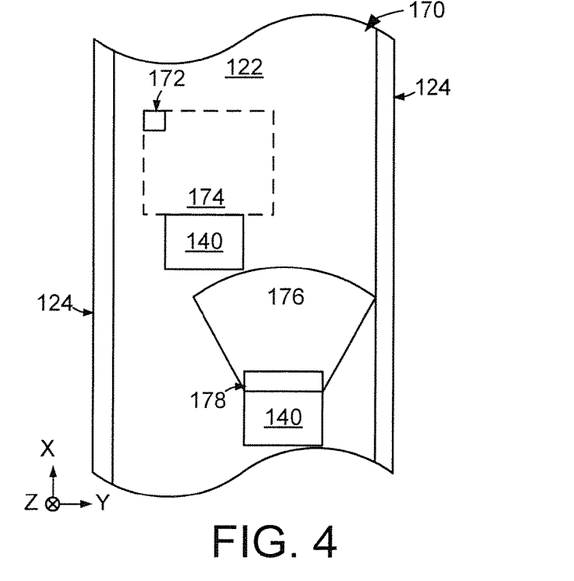
FIG. 4 illustrates a top view of portions of an example floor maintenance assembly arranged in accordance with assorted embodiments.

FIG. 4 depicts a top view of an example floor environment 170 in which a maintenance device 140 can operate to perform at least mapping functions. The environment 170 may be an aisle 122 of a retail location or any walkway of an industrial or commercial facility. Deployment of the automated maintenance device 140 can correspond with floor mapping that involves the collection of floor data and subsequent interpretation of that data into a visual, graphic, or mathematical representation of at least the physical dimensions of the floor surface, such as profile characteristics of a floor surface 126 that can identify existing imperfections, like a ripple in matting or rubber.

With many floor sensing robots and drones, the measurement resolution is quite low, such as the 1 inch square resolution of region 172. The relatively low measurement resolution can correspond to a long time to map nearly any appreciable region of a retail, commercial, or industrial facility. However, the fixed measurement resolution of floor sensing equipment can either take fewer measurements to map a region, which provides a less accurate representation of a floor, or measure different small regions of a floor surface over time and piece together an overall floor surface map, which is susceptible to changes to floor surface and floor layout. In systems that utilize optical sensors at ground level in fixed or dynamic positions to map floor surface anomalies, the low resolution can mandate numerous different sensors With these time consuming and/or inaccurate issues with fixed measurement resolution robots in mind, various embodiments are directed to configuring the maintenance device 140 with measurement sensors 150 that allow for different measurement resolutions to be utilized. For instance, the device 140 may initially employ a relatively large, but still accurate and thorough, measurement resolution 174, such as 1 square foot, before switching to a different measurement resolution in response, such as digital or laser imaging to produce detailed floor surface profiles.

The triggering of a change in measurement resolution may not be static and can be intelligently set based on any number of floor, environmental, or manual inputs. For instance, floor measurements may be plagued with errors at the first measurement resolution, a sensor malfunction is detected, the floor has numerous or severe imperfections, or patrons are detected around the maintenance device 140. The switching of measurement resolutions may involve activating, or deactivating, one or more sensors and/or measurement technologies resident in the device 140. It is contemplated that a measurement resolution may have a shape, such as the fan shape of resolution region 176, that differs from the polygon or rectangular shapes of other resolution regions 172/174.

The ability to change measurement resolution shapes and/or sensing technologies with a mapping circuit 152 allows a maintenance controller 142 to conduct redundant and/or complementary floor sensing operations at will. As a non-limiting example, a device 140 can concurrently, or sequentially, utilize different measurement resolutions and different resolution region shapes, such as regions 176 and 178, with different, or redundant, measurement technologies and/or sensors. The adaptive capabilities of the maintenance device 140 with regards to how a floor surface is measured allows for a diverse range of operational characteristics that can be customized to the floor surface, floor environment, and manual input of employees of a facility.

It is contemplated that floor measurements can be taken by the device 140 on a periodic basis, such as every night, then detailed historical information can be logged and used to create a floor map. A baseline can be determined after a floor has been cleaned to identify the rate at which the floor becomes worn, the effectiveness of certain cleaning products, and the time associated with cleaning or repair operations. By analyzing measured data over time, other behavioral information can be gleaned, such as high traffic patterns by customers/employees, historical friction levels due to weather conditions like tracked in moisture, salts, debris, and residual build-up from waxes, cleaners, and surfactants that can attract dirt and grime if not properly cleaned and removed over time.

While a maintenance device 140 can be configured for retail establishments, the sensors 150, device size, and device shape, for example, can be customized for storage facilities, warehouses or other locations where few or no humans usually go. Through the mapping functions of a maintenance device 140 a floor can be certified that the floor, and consequentially the facility, is in safe condition to receive customers/employees. It is contemplated that the maintenance device 140 can be configured to be used in multiple applications, such hotels, hospitals, office complexes, industrial, and other locations where hard floor surfaces are traveled by pedestrian foot-traffic.

In some cases, a maintenance system may result in the autonomous issuance of floor safety certifications via the functions of mapping 152 and safety 154 circuits. Such automated certifications can replace relatively inaccurate and labor-intensive systems that involve taking manual measurements of less than all of a floor surface or region. Accordingly, assorted embodiments utilize the mapping circuit 152 and ability to customize and adapt floor measurement resolution and/or techniques allows a safety circuit 154 to certify a floor surface as safe for use, free from contamination, and/or within operational tolerances from installed physical dimensions.

Figure 5:
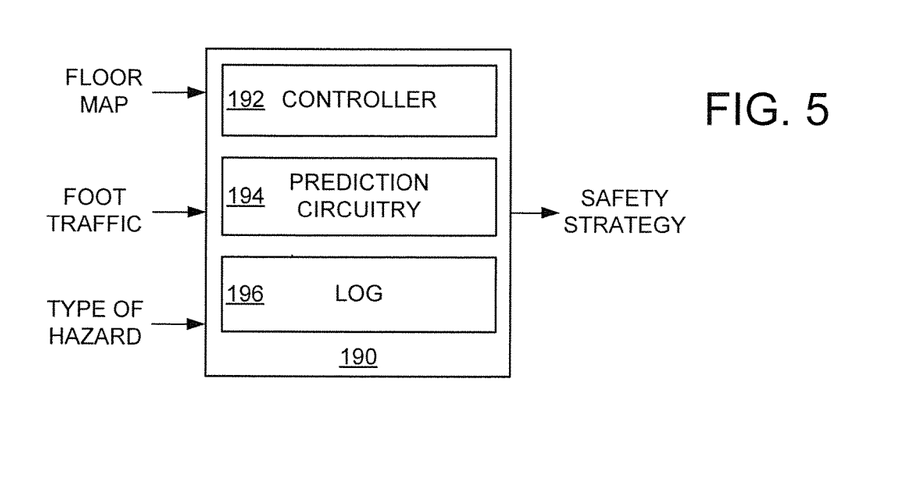
FIG. 5 represents an example safety module portion of a floor maintenance assembly configured in accordance with various embodiments.

FIG. 5 depicts a block representation of an example safety module 190 that utilize a safety circuit 154 of one or more floor maintenance devices 140 to provide autonomous, intelligent mitigation of risk in accordance with various embodiments. The safety module 190 can be handled by one or more controllers 192 that may be local, or remote, to a maintenance device 140. That is, a device 140 may have a local controller 192 that is supplemented continuously, or sporadically, by at least one controller connected to the device 140 via a wired or wireless connection.

The ability to provide supplemental computer processing power via remote controller supplementation of a local controller 192 allows the device 140 to be relatively power efficient and lightweight in terms of processing while still providing robust computing capabilities, which can decrease the complexity and latency of the device 140 in response to encountered flooring issues. It is contemplated, but not required, that the local controller 192 can direct operations of multiple aspects of the floor maintenance device 140, such as the mapping 152, cleaning 156, and/or correction 158 circuits. With multiple core processing controllers 192, it is possible for a single controller 192 to concurrently carry out diverse floor maintenance operations without adding latency to any of the constituent sub-routines (mapping/cleaning/safety/correction).

The local controller 192 can activate a local safety circuit 154 to evaluate assorted input data, such as floor mapping information, foot traffic derived from floor mapping information, mechanical wear, and floor contamination information, to generate one or more safety strategies that prescribe reactive and/or proactive actions in order to correct a floor hazard and/or mitigate risk associated with the hazard. A safety strategy can be continuously or sporadically executed by a maintenance device 140 to actually correct a safety hazard, such as cleaning a spill or polishing a rise in the floor surface, or warn others of a hazard, such as with lights, sounds, or a physical presence over the hazard.

Although other data and information can be inputted into the safety module 190, the controller 192 and safety circuit 154 can correlate the received floor inputs to safety issues that can be handled by the safety strategy. For instance, the safety circuit 154 can correlate a mapped floor recess as foot traffic that is susceptible to pooling of liquids in the future as a result of an inadvertent spill or routine cleaning. The safety strategy can prescribe several different manners depending on the other inputted floor information. As a non-limiting example, the safety strategy may prescribe deploying a separate cleaning device or schedule a cleaning operation while the maintenance device 140 physically blocks access to the discovered hazard. Another non-limiting example of the safety strategy may call for partially cleaning or correcting a hazard with the maintenance device 140 to mitigate the risk of patron injury without shutting down foot traffic in a particular region for an extended period of time.

The generation of the safety strategy with the safety circuit 154 can identify encountered hazards and correlate those hazards to several different corrective actions based on the current environment around a maintenance device 140. In other words, the controller 192 can execute different reactive actions prescribed by the safety strategy in response to the time of day, number of patrons in a region, time expected to complete an action, amount of power left in the maintenance device 140, and/or number of other detected hazards in a floor surface. Hence, the safety strategy can provide robust reactions to encountered safety hazards that are dynamic based on environmental conditions, which optimizes mitigation of a hazard compared to static reactive actions.

While reactive actions of a safety strategy can be efficiently carried out, the ability to conduct one or more proactive actions to mitigate or prevent safety hazards provides optimal floor maintenance over time in response to sensed floor conditions. The local controller 192 can utilize a prediction circuit 194 that correlates inputted floor parameters to future floor hazards. That is, the prediction circuit 194 can identify current floor conditions that do not currently pose a safety hazard with future conditions that do pose a hazard. The prediction circuit 194 can compare currently sensed floor parameters with previously experienced floor conditions stored in a local log 196 and/or with model data stored in local device memory from other maintenance devices.

By predicting future floor conditions with the prediction circuit 194, the safety circuit 192 can prescribe one or more proactive actions in the safety strategy that prevents a hazard, reduces the severity of a hazard, or reduces the risk of a hazard occurring. As with reactive actions, proactive actions prescribed by the safety strategy can be dependent on the environment of the maintenance device, such as number of patrons, time available to conduct actions, supplies carried on the maintenance device, and other scheduled floor maintenance operations. Execution of one or more proactive actions are expected to manipulate presently non-hazardous areas of a floor surface with polishing, repair, or other correction techniques in order to mitigate future hazards from forming as a result of current foot traffic derived from the mapping of the floor surface.

Figure 6:
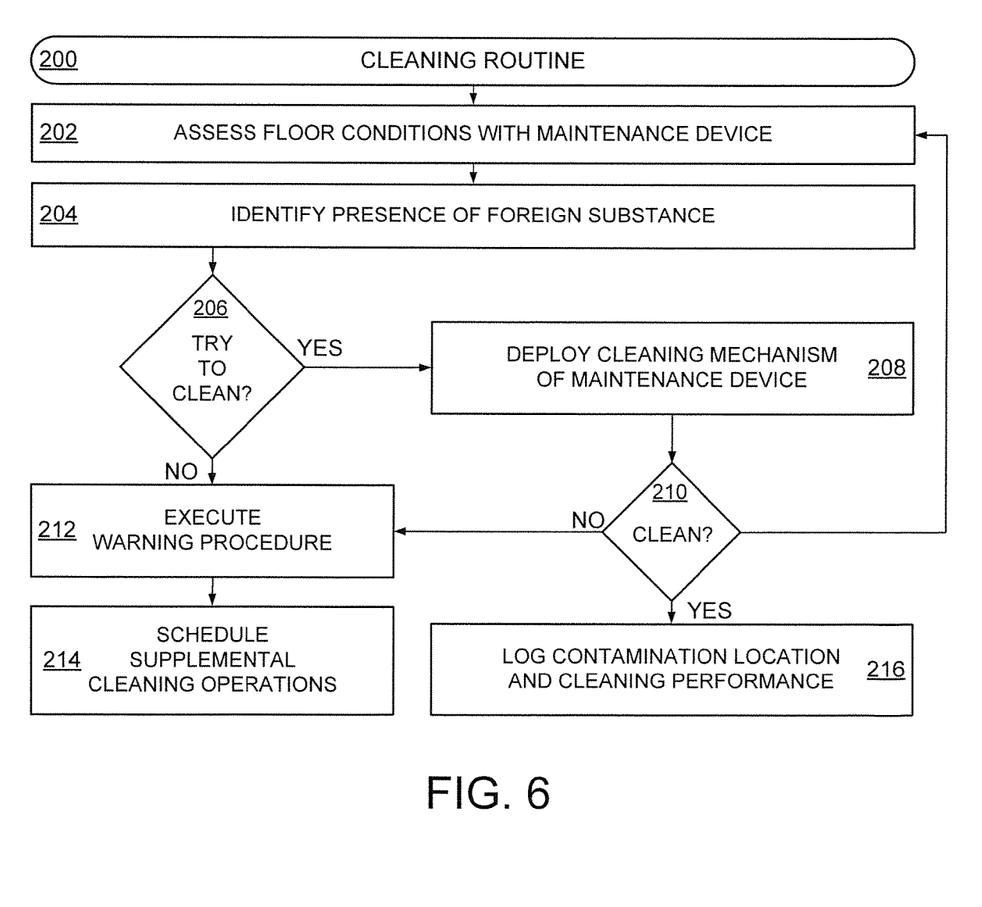
FIG. 6 conveys an example cleaning routine that can be carried out by a floor maintenance assembly as part of an automated floor maintenance system.

With the various reactive and proactive capabilities of a safety strategy, a safety module 190 can provide enhanced patron safety that reduces the potential liability of a facility to patron injury due to floor conditions, such as slip and falls. The capabilities of a maintenance device 140 to optimize safety can be complemented by the ability to intelligently clean a floor surface in response to detected, and predicted, floor conditions. FIG. 6 conveys an example cleaning routine 200 that can be carried out with the various embodiments of a floor maintenance system that employ one or more floor maintenance devices.

The routine 200 can begin with activation of one or more sensors of a maintenance device in step 202 to assess floor conditions, such as via a mapped floor surface, derived foot traffic patterns, wear, and presence of imperfections. It is contemplated that the information gathered in step 202 can be used to generate a safety strategy that may involve assorted cleaning aspects. For example, a safety strategy can correlate current floor surface conditions with cleaning contingency situations dependent on the manner in which floor contaminants are encountered and the capabilities of the maintenance device at that time.

Regardless of whether a safety strategy is in place, step 204 can identify the presence of a foreign contaminant or condition. Such identification can be done with one or more sensors and may involve comparison of sensed conditions with a floor surface map generated by the maintenance device. For instance, a first sensor can detect a liquid and a different second sensor of the maintenance device can confirm the presence of the liquid by comparing current floor surface depth with previously mapped floor depth, reflectivity, coefficient of friction, and/or anomalies. It is contemplated that different sensors of a maintenance device can be used to identify the type of liquid, or other debris, as well as the physical extent of the contamination.

The inputted contaminant information allows the maintenance device to accurately identify one or more cleaning procedures to eliminate the contamination and return the floor surface to previous, dry parameters that correspond to previously mapped physical parameters. Identifying the substance and physical extent of a contamination allows decision 206 to determine if the maintenance device should attempt to partially or completely clean a floor region and/or what corrective action is needed, such as signage, alerts, or other deployed action. Decision 206 can evaluate one or more operational parameters, such as time to complete and predicted chance a cleaning procedure will completely eliminate the contamination, to determine if cleaning the contamination is the most effective means for increasing patron safety in the shortest amount of time. It is noted that decision 206 may also consider detected environmental conditions to determine if the maintenance device can, or should, engage in cleaning activities.

A decision to attempt to clean a contamination triggers step 208 to deploy a cleaning mechanism of the maintenance device. A non-limiting example of a cleaning mechanism consists of an articulated brush, mop, or absorbent material with, or without, a liquid cleaner being dispensed. Some embodiments of a cleaning mechanism involves several different activities and/or cleaning materials being sequentially applied to the floor surface or if manual corrective action is needed, such as moving a mat, replacing a mat, or placing temporary warnings. The effectiveness of the activity of step 208 is evaluated in decision 210 to determine if the cleaning operations were effective enough to eliminate the contamination and return the floor surface to safe working order. It is contemplated that decision 210 can evaluate the cleaning activity of another device or human.

A conclusion in decision 210 that the cleaning actions of step 208 were ineffective can cycle routine 200 to step 204 where the contamination is evaluated with one or more sensors of the maintenance device. If decision 210 determines the cleaning actions of step 208 were ineffective at eliminating a safety hazard and/or presence of foreign contamination, or if no attempt at cleaning was conducted from decision 206, step 212 can deploy a warning procedure in accordance with a safety strategy. Such warning procedure can involve activating sensory queues, such as lights, audible alerts, or signage, proximal a contamination to bring attention to the presence of a contaminant. A warning procedure may alternatively position the device, or an ancillary device, over the contaminate, with or without, one or more sensory queues to ensure patrons are aware of safety hazard and are potentially prevented from contacting the foreign substance.

Once a warning procedure has been conducted in step 212, step 214 communicates with a host to schedule a cleaning of the floor surface experiencing a contamination. The scheduled cleaning may be immediate, such as the current deployment of one or more cleaning devices, or delayed, such as for future attention when less number of patrons could be present. A scheduled cleaning may have a prescribed cleaning procedure based on the attempted cleaning operations of step 208, which can enhance the likelihood that the scheduled cleaning is effective and efficient at removing the contamination.

In the event decision 210 determines that the cleaning activities of step 208 were effective, step 216 logs operational information about the contamination and cleaning, such as time of occurrence, size of contamination, cleaning procedure utilized, and resultant floor surface condition. Step 214 may involve a supplemental floor mapping operation to ensure the floor surface is free of any contamination that can increase floor hazards, which can be used to certify a floor is clean and conducive to safe patron use.

Figure 7:
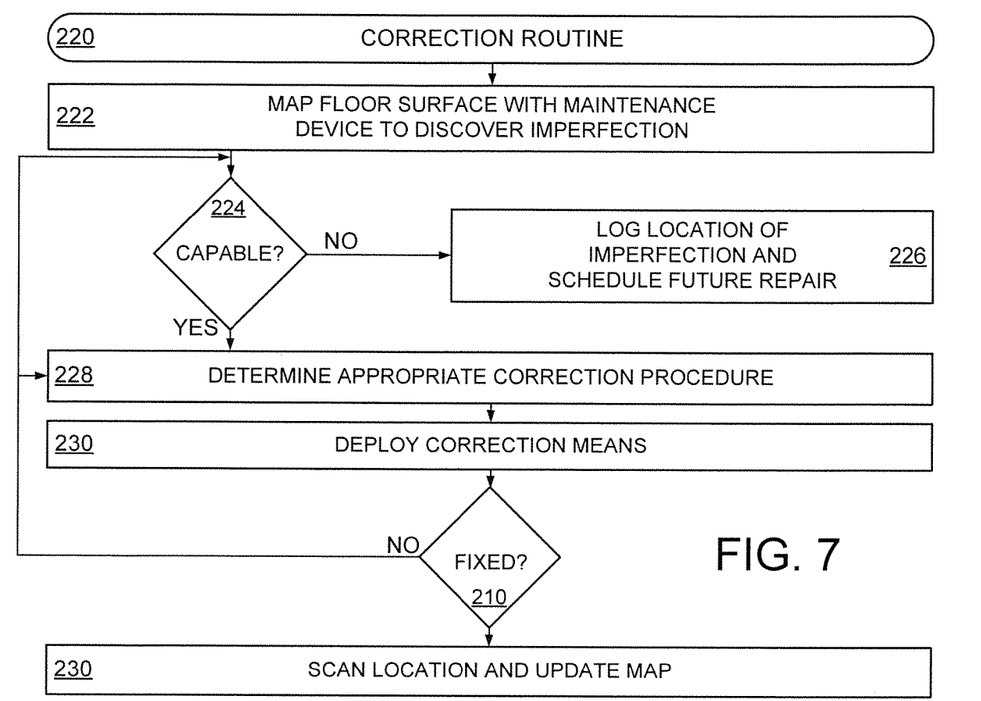
FIG. 7 is an example correction routine that may be executed by a floor maintenance assembly as part of an automated floor maintenance system.

By intelligently utilizing the assorted floor mapping, detection, and cleaning capabilities of a maintenance device, the risk of injury due to unexpected floor contamination can be mitigated and efficiently eliminated. The assorted capabilities of the maintenance device can also be employed to intelligently mitigate the risk of patron injury and floor performance degradation due to the presence of floor surface imperfections. FIG. 7 depicts an example correction routine 220 that can be executed by a maintenance device in accordance with a floor maintenance system. The routine 220 initially maps a floor surface with a maintenance device and at least one imperfection is discovered from the resultant floor map in step 222.

It is noted that an imperfection can be different than the presence of a contaminant, but may be detected and/or verified in manners similar to the use of maintenance device sensors in routine 200 to identify the presence of contaminants. The presence of an imperfection in step 222 prompts decision 224 to determine if the maintenance device possesses the floor servicing capabilities needed to correct the imperfection. Decision 224 may further evaluate one or more potential alternatives to floor correction with the maintenance device in an effort to ensure the most efficient procedures are used to return a floor surface to acceptable levels of pedestrian safety. It is contemplated that decision 224 concludes that a detected floor imperfection poses no appreciable risk to pedestrian safety and is acceptable, as-is and without correction.

If decision 224 determines that an imperfection is not correctable by the maintenance device, either due to lack of device capabilities or appropriate device availability, step 226 logs the location of the imperfection and schedules a notice to attend to the imperfection at a later time. The scheduling of step 226 may involve the maintenance device prescribing a particular machine, device, and/or correction procedure in response to evaluation of the imperfection.

A determination that an imperfection can be corrected by the maintenance device in decision 224 triggers the device controller to determine the appropriate correction technique with the correction circuit of the device in step 228. As such, step 228 evaluates several different correction techniques, such as tools, time, and number of steps, to determine the most efficient and/or optimal correction means for the particular imperfection in view of the current floor surface environment and the capabilities of the maintenance device. The correction means is then deployed in step 230 and is carried out as prescribed by step 228. It is contemplated that step 230 can be concurrently executed with one or more warning procedures as prescribed by a safety strategy to ensure pedestrian identify a hazard while imperfections are repaired.

The correction operations of step 230 can be verified in decision 232 by one or more sensing techniques. For example, a repaired imperfection can be mapped or otherwise monitored by one or more sensors of the maintenance device to identify the quality of the correction means deployed in step 230 and the integrity of the floor surface after the correction means. If the correction means are deemed insufficient in decision 232, the routine 220 can return to decision 222 to reassess the floor imperfection or return to step 228 to determine what additional correction means are necessary to bring the integrity of the floor surface to an acceptable, safe condition.

When decision 232 determines that an imperfection is properly corrected, step 234 proceeds to update the floor map with the newly corrected floor surface information. The correction of one or more detected imperfections either with the maintenance device of a different scheduled correction machine acts to prevent relatively small imperfections from becoming larger and/or more dangerous, which extends the serviceable life of a floor surface while mitigating the risk of pedestrian injury due to the unexpected topography of a floor surface containing an imperfection.

Figure 8:
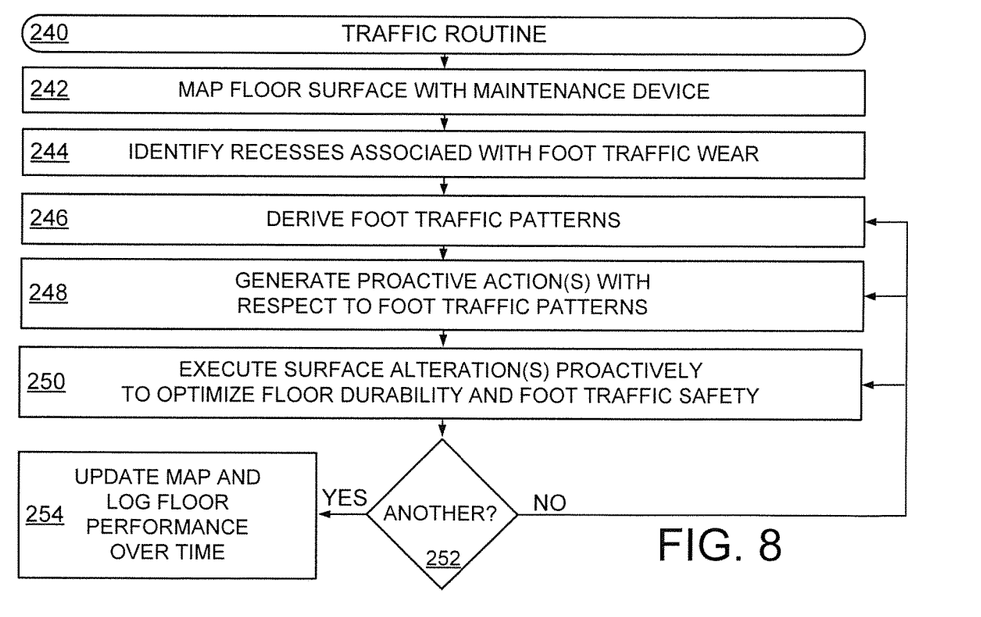
FIG. 8 provides a flowchart of an example traffic optimization routine that can be utilized as part of an automated floor maintenance system in some embodiments.

Through the use of the assorted mapping, safety, and correction capabilities of a maintenance device, encountered floor hazards can be eliminated or at least mitigated. However, some embodiments of a maintenance system utilize the capabilities of a maintenance device to proactively enhance the performance of a floor surface based on derived foot traffic without the presence of an existing hazard. FIG. 8 depicts an example traffic routine 240 that can employ a maintenance device to optimize floor surface performance over time. Some, or all, of a floor surface in a facility, or environment, can be mapped in step 242 from the information gathered from sensors of a maintenance device.

Once, the floor surface map has been processed and rendered into a format that shows at least the topography of the floor surface, as generally illustrated in FIG. 2. The mapped topography allows a device controller to identify floor surface wear in step 244 that corresponds with foot traffic. Such floor surface wear can be, but is not limited to, particular locations of wear relative to shelves or other stationary equipment, patterns of surface degradation, reflectivity gradient, and/or coefficient of friction detected with one or more sensors of the maintenance device. It is noted that some detected floor surface information may not be explicitly represented in a floor map, but is available in step 244 to discern foot traffic from other forms of floor surface wear, such as wear from wheels, forklifts, and non-pedestrian impact.

The identification of foot traffic allows the device controller to derive foot traffic patterns and/or mechanical wear in step 246 in relation to stationary objects within an environment. It is contemplated that the foot traffic and mechanical wear patterns can be indicative of product placement, product popularity, object layout within an environment, and/or volume of pedestrians within an environment. The foot traffic patterns may be different from floor surface wear detected in step 244 and can indicate both where pedestrians walked and how long they stood in one place, which can be used to render an accurate representation of where pedestrians spend the most time within a floor surface environment.

The knowledge of traffic patterns and patron movement patterns allows a maintenance device controller to generate one or more proactive actions that are directed to optimizing the floor surface for greater than average foot traffic. A proactive action is not limited to a particular activity, but can involve altering the floor surface in high traffic areas to increase reflectivity, coefficient of friction, and/or average floor depth uniformity. The maintenance device can perform one or more proactive actions, such as floor polishing, refurbishing, filling, molding, and etching, to physically change the dimensions and/or characteristics of the floor surface in step 250 to increase floor performance and/or longevity, such as greater traction, reduced depth variability, or heightened moisture aversion.

Decision 252 evaluates if the proactive actions conducted in step 250 were sufficient to maintain and/or increase floor performance over time based on current detected foot traffic patterns. Affirmation that the actions of step 250 were sufficient prompts step 254 to update the floor surface map and log the performance metrics of the newly renovated portions of the floor. Step 254 may involve a new map, or merely an update to an existing map. If the floor alterations are not sufficient, decision 252 can cycle routine 240 to steps 246, 248, or 250. That is, a new foot traffic pattern can be derived, new proactive actions can be generated, and/or additional surface alterations can be executed to provide the floor physical dimensions that are desired to increase pedestrian safety and floor surface durability over time.

Through the assorted embodiments of a floor maintenance system, at least one floor maintenance device can be utilized to dynamically map a floor surface using the best possible mapping techniques for the device and the detected environment. An accurate and efficient floor surface map can be used to optimize the cleaning of contaminants, correction of floor imperfections, and derivation of foot traffic patterns. As a result, a floor surface can be certified as clean, free of hazards, and safe for pedestrian use. The ability to utilize assorted aspects of a maintenance device to carry out reactive and/or proactive actions to improve the performance and longevity of a floor surface allows for continued flooring optimization over time.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A floor maintenance device comprising a first sensor and a second sensor each connected to a local controller, the local controller configured to change the first sensor from a first floor detection resolution to a different second floor detection resolution and the second sensor from a third resolution to a different fourth resolution in response to a detected recess in a floor, the first sensor and second sensor concurrently measuring the floor for varying topography.

2. The floor maintenance device of claim 1, wherein the local controller identifies a hazard in response to data collected from at least one sensor.

3. The floor maintenance device of claim 1, wherein the local controller classifies a floor contamination in response to data collected from at least one sensor.

4. The floor maintenance device of claim 3, wherein the local controller identifies two different cleaning actions that are directed at eliminating the floor contamination.

5. The floor maintenance device of claim 4, wherein the local controller selects a single cleaning action to execute from the two different cleaning actions.

6. The floor maintenance device of claim 5, wherein the single cleaning action is chosen in response to a generation of a safety strategy.

7. The floor maintenance device of claim 1, wherein the local controller identifies a correction action directed to correcting the detected recess.

8. The floor maintenance device of claim 7, wherein the correction action mitigates an injury risk of the detected recess.

9. The floor maintenance device of claim 1, wherein the first floor detection resolution is one square inch and the second floor detection resolution is one square foot.

10. The floor maintenance device of claim 1, wherein the second floor detection resolution has a different pattern shape than the first floor detection resolution.

11. A system comprising:
   a local controller connected to a mapping circuit and a prediction circuit; and
   one or more sensors connected to the local controller, the local controller generates a safety strategy in response to data collected from the one or more sensors and at least one event predicted by the local controller, the local controller proactively changing from a first floor detection resolution to a different second floor detection resolution in response to a prediction of a recess in a floor that poses a safety hazard.

12. The system of claim 11, wherein the safety strategy correlates the predicted floor recess identified by the mapping circuit as from foot traffic derived from one or more detected recesses in the floor.

13. The system of claim 11, wherein the safety strategy deploys a separate cleaning device in response to an identified floor condition.

14. The system of claim 13, wherein the safety strategy physically blocks a floor condition with a device housing the local controller and one or more sensors until the separate cleaning device arrives.

15. The system of claim 11, wherein the local controller activates a connected cleaning tool to partially correct the detected floor condition prior to a future correction action being is performed as prescribed by the safety strategy.

16. A method comprising:
   connecting a local controller to one or more sensors in a floor maintenance device;
   collecting data relating to a floor surface with the one or more sensors with a first floor detection resolution;
   detecting a recess in a floor with the local controller;
   generate at least one corrective action with the local controller to increase average floor depth uniformity in an area predicted to experience mechanical wear in the future, the area identified by the local controller in response to the detected recess; and
   changing the first floor detection resolution to a different second floor detection resolution in response to a detected floor condition.

17. The method of claim 16, wherein the second floor detection resolution is used to identify the detected recess associated as mechanical wear in the floor corresponding with foot traffic wear.

18. The method of claim 17, wherein the local controller derives a foot traffic pattern in response to the foot traffic wear.

19. The method of claim 16, wherein the local controller generates a proactive action to increase a reflectivity value in the area identified by the local controller, the reflectivity value selected to increase pedestrian safety.

20. The method of claim 19, wherein the proactive action involves polishing a floor surface.

* * * * *